No. 767,294. PATENTED AUG. 9, 1904.
J. F. F. LANDIS.
NUT LOCK.
APPLICATION FILED JAN. 14, 1904.
NO MODEL.
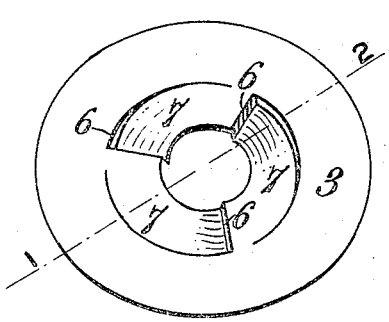
FIG. 1.
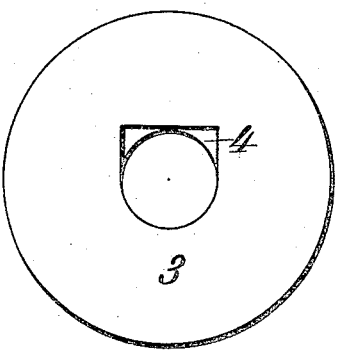
FIG. 2.
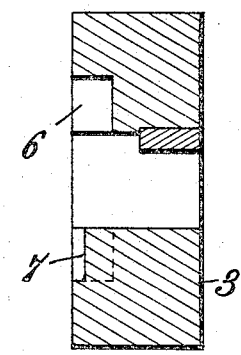
FIG. 3.
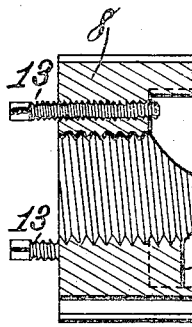
FIG. 6.
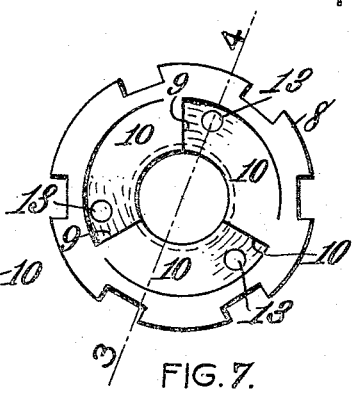
FIG. 7.
FIG. 4.
FIG. 5.
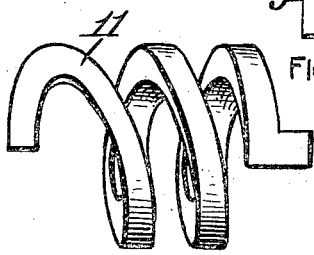
FIG. 8.
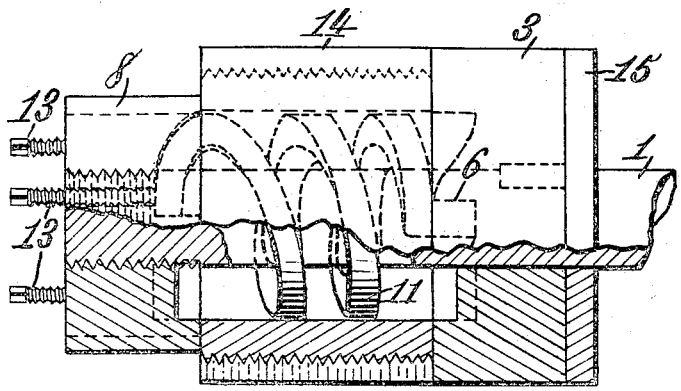
FIG. 12.
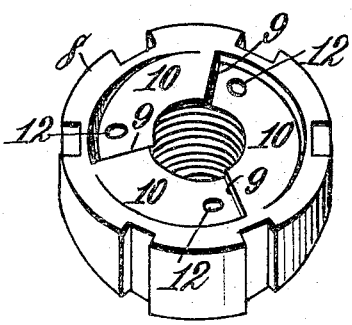
FIG. 9.
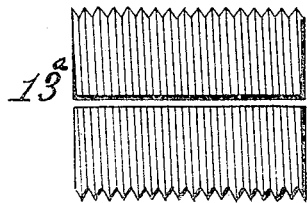
FIG. 11.
FIG. 10.
WITNESSES— INVENTOR John F. F. Landis No. 767,294.

Patented August 9, 1904.

UNITED STATES PATENT OFFICE.

JOHN F. F. LANDIS, OF YORK, PENNSYLVANIA.

NUT-LOCK.

SPECIFICATION forming part of Letters Patent No. 767,294, dated August 9, 1904.

Application filed January 14, 1904. Serial No. 188,993. (No model.)

*To all whom it may concern:*

Be it known that I, JOHN F. F. LANDIS, a citizen of the United States, residing at York, in the county of York and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to nut-locks; and it has for its object to provide a lock which will effectively prevent the nut from turning in its unlocking or releasing direction and in which also all strain will be taken from off the bolt or rod or other member to which the nut is applied.

The invention comprises generally a collar rigidly secured to the bolt, rod, or other member, a nut, and an interposed spiral spring, said spring at one end having a bearing against a shoulder on the collar and at the other end having a bearing against a shoulder on the nut, so that if pressure or power be applied to the nut in the direction to turn or release the same said spring will afford a resistance against turning the nut in such direction, and thus securely hold the same in its locked position. Means are also provided for compressing the spring so that when the nut is to be unlocked the end of the spring will be moved out of engagement with the shoulder on the nut, so as to permit the latter to be unscrewed.

To the accomplishment of the foregoing and such other objects as may hereinafter appear, the invention consists in the construction and in the combination of parts hereinafter particularly described and then sought to be clearly defined by the claims, reference being had to the accompanying drawings, forming a part hereof, and in which—

Figure 1 is a face view of the collar looking at the face in which is formed the shoulders for engagement therewith of one end of the spring. Fig. 2 is a similar view looking at the opposite face of the collar and showing a key-seat formed therein. Fig. 3 is a cross-section on the line 1 2 of Fig. 1 and showing the key in position in the collar. Fig. 4 is an end view of the key; Fig. 5, a plan view of the key; Fig. 6, a sectional view of the nut on the line 3 4 of Fig. 7. Fig. 7 is a face view of the nut looking at the face having the shoulders. Fig. 8 is a side view of the spring. Fig. 9 is a perspective of the nut. Fig. 10 is a plan view of the bolt, rod, or other threaded member with part broken away. Fig. 11 is a side view of a split sleeve which may encircle the spiral spring; and Fig. 12 is a side view, partly in section, showing the several parts as they may be assembled.

In the drawings the numeral 1 designates the threaded bolt, rod, or other member to which the nut may be applied and which is formed with a key-seat 2. To this bolt or member is affixed a collar 3, which is formed with a key-seat 4, in which and in the key-seat 2 of the rod 1 will fit the key 5, so as to rigidly secure the collar to the bolt or other member 1. One face of the collar 3 is formed with any desired number of shoulders 6 and inclines 7, said inclines rising from the base of one shoulder to the top or apex of the next succeeding shoulder, as illustrated. The nut 8 is formed in one face with any desired number of shoulders 9 and inclines 10, which extend from the base of one shoulder to the top or apex of the next succeeding shoulder, as illustrated clearly in Figs. 7 and 9 of the drawings.

The numeral 11 designates a spiral spring which will encircle the bolt, rod, or other member 1 and have one end bear against one of the shoulders 6 of the fixed collar 3 and the opposite end bear against one of the shoulders 9 of the nut 8 when the parts are assembled and in their locking positions.

Under the construction described when the nut is turned in a direction to tighten it the spiral spring will be somewhat compressed, and the nut will be free to glide over the end of the spring next thereto without locking engagement with any shoulder on the nut, and if the frictional contact with the spring be such as to have a tendency to turn the spring the opposite ends of the spring will rise on the incline of the nut and fixed collar, respectively, the spring yielding somewhat under such operation, and when the ends of the springs pass from the highest points of the inclines or over the shoulders to the nut and collar, respectively, the spring will expand and its ends be snapped into position in front of the shoulders to the nut and collar, respectively, and by engagement with said shoulders the nut will be prevented from turning backwardly or from unscrewing, since the ends of the spring will bear against the shoulders of the nut and collar, respectively, and thus prevent the nut from unturning or unscrewing. The nut 8 is illustrated as formed with threaded openings 12, into which are tapped the bolts 13, so that by turning the tap-bolt whose end may be opposite the end of the spiral spring 11 the latter may be pressed inwardly or compressed so as to release it from engagement with the shoulder of the nut, and thus permit the nut to be turned or unscrewed for loosening the parts. Other means, however, may be employed for moving the end of the spiral spring out of engagement with the shoulder of the nut, so that the latter may be unscrewed. For instance, if the portion of the spiral spring between the nut 8 and the fixed collar 3 be exposed any suitable tool may be forced between the end of the spring and the nut, so as to compress the spring and draw its end out of engagement with the shoulder on the nut, thus permitting the nut to be unscrewed. I prefer, however, for some purposes to have the portion of the spiral spring between the nut 8 and the collar 3 inclosed or incased, and for that purpose I provide a sleeve to encircle the spiral spring at such point. This sleeve is designated in the form illustrated by the numeral 13ª and, as shown, is a split or two-part sleeve for convenience in applying and removing the same, although this feature of the invention is not confined to employing a split form of sleeve, as the sleeve may be unsplit, if so desired. The sleeve 13ª is illustrated as formed with threads on its periphery, and it is contained within an outer sleeve or band 14, which will be interiorly threaded, so that the outer and inner sleeve may thus be connected together. This feature of the encircling sleeve may be employed in cases where it is desirable to have the coil-spring inclosed or incased, and this form is particularly well adapted for use where the nut is an axle-nut of a wheeled vehicle. When it is desired to unscrew the nut in such a case, the outer band or sleeve 14 will be unscrewed from the inner sleeve 13ª and the two parts of the latter then removed, after which the coiled spring can be compressed so as to release its end from engagement with the shoulder of the nut, and thus permit the latter to be unscrewed. If in such construction the sleeve 13ª should be in one piece instead of being a split sleeve, it would have to be broken by a suitable tool before it could be removed to permit access to the spiral spring. The numeral 15 designates a collar or washer which is fitted loosely on the bolt-rod or other member and bears against the face of the fixed collar 3, so as to prevent the possibility of the key 5 working its way out of its seat, this collar 15 lying between the end of the fixed collar 3 and the object which is to be clamped by the bolt or nut.

I have illustrated and described with particularity the preferred details of construction and arrangement of the several parts; but it is obvious and to be understood that changes can be made and essential features of my invention still be retained.

The outer face or circumference of the nut 8 is illustrated as formed with notches; but such is merely for the purpose of affording a better grip of the wrench on the nut when turning the latter.

Having described my invention and set forth its merits, what I claim is—

1. In a nut-lock, the combination with the rod or bolt, of the collar rigidly secured to the rod or bolt against rotation thereon, the nut, and the spiral spring, the collar and nut being formed with shoulders against which the opposite ends of the spring bear in locking engagement to prevent the nut being unscrewed and permitting it to be turned in the opposite direction to tighten the nut, substantially as described.

2. In a nut-lock, the combination with the rod or bolt, of the collar fitted to the rod or bolt, a key locking the collar to the rod or bolt against rotation thereon, the nut, and the spiral spring, the collar and nut being formed with shoulders against which the opposite ends of the spring bear in locking engagement to prevent the nut being unscrewed and permitting it to be turned in the direction to tighten the nut, substantially as described.

3. In a nut-lock, the combination with the rod or bolt, of the collar fitted to the rod or bolt, a key locking the collar to the rod or bolt against rotation thereon, a washer fitting against the collar to hold the key in place, the nut, and the spiral spring, the collar and nut being formed with shoulders against which the opposite ends of the spring bear in locking engagement to prevent the nut being unscrewed and permitting it to be turned in the direction to tighten the nut, substantially as described.

4. In a nut-lock, the combination with the rod or bolt, of the collar secured to the bolt against rotation thereon, the nut, and the spiral spring, the collar and nut both being formed with inclined faces for the ends of the spring to ride over and with shoulders against which the opposite ends of the spring will engage to lock the nut and prevent it from being unscrewed while permitting it to be turned in the direction to tighten the nut, substantially as described.

5. In a nut-lock, the combination with the rod or bolt, of the collar secured to the rod or bolt against rotation, the nut, the spiral spring, the collar and nut being formed with shoulders against which the opposite ends of the spring bear to lock the nut and prevent it being unscrewed, and a sleeve encircling the spring between the collar and nut, substantially as described.

6. The nut-lock comprising the fixed collar, the nut, the spiral spring, the collar and nut being formed with shoulders with which the opposite ends of the spring engage, a split sleeve encircling the spiral spring, and a collar or band fitting around the split sleeve, substantially as described.

7. The nut-lock comprising the collar fixed against rotation, the nut, the spiral spring, the collar and nut being formed with shoulders against which the opposite ends of the spring bear to lock the nut, a sleeve encircling the spring, and a band around the sleeve, substantially as described.

8. The nut-lock comprising the fixed collar, the nut, and the spiral spring, the collar and nut being formed with inclines for the ends of the spring to ride over and shoulders for opposite ends of the spring to engage with, and the nut formed with an opening at the lower portion of each incline for a tap-bolt to engage the end of the spiral spring to release it from and keep it out of engagement with the shoulders of the nut, substantially as described.

In testimony whereof I affix my signature in presence of two witnesses.

JOHN F. F. LANDIS.

Witnesses:
 NOAH C. MAY,
 WM. F. LANDIS.